United States Patent
Heuer

(10) Patent No.: US 12,433,652 B2
(45) Date of Patent: Oct. 7, 2025

(54) TOOL ATTACHMENT POINT WITH ALIGNMENT AID FOR SCREW ELEMENTS

(71) Applicant: MIMEO MEDICAL GmbH, Filderstadt (DE)

(72) Inventor: Frank Heuer, Filderstadt (DE)

(73) Assignee: MIMEO MEDICAL GmbH, Filderstadt (DE)

( * ) Notice: Subject to any disclaimer, the term of this patent is extended or adjusted under 35 U.S.C. 154(b) by 330 days.

(21) Appl. No.: 18/012,844

(22) PCT Filed: Jun. 23, 2021

(86) PCT No.: PCT/EP2021/067103
§ 371 (c)(1),
(2) Date: Dec. 23, 2022

(87) PCT Pub. No.: WO2021/259978
PCT Pub. Date: Dec. 30, 2021

(65) Prior Publication Data
US 2023/0320769 A1    Oct. 12, 2023

(30) Foreign Application Priority Data

Jun. 24, 2020 (DE) ...................... 10 2020 003 774.7

(51) Int. Cl.
*A61B 17/86* (2006.01)
*A61B 17/70* (2006.01)

(52) U.S. Cl.
CPC ...... *A61B 17/8615* (2013.01); *A61B 17/7032* (2013.01)

(58) Field of Classification Search
CPC ................................. A61B 17/8615
See application file for complete search history.

(56) References Cited

U.S. PATENT DOCUMENTS

| 5,171,117 A | 12/1992 | Seidl |
| 2014/0066945 A1* | 3/2014 | Humphreys ....... A61B 17/8615 606/104 |
| 2015/0289905 A1 | 10/2015 | Biedermann et al. |

FOREIGN PATENT DOCUMENTS

| DE | 10 2013 105 744 | 12/2014 |
| EP | 0 626 277 | 11/1994 |
| EP | 2 932 929 | 10/2015 |

OTHER PUBLICATIONS

International Search Report of the ISA with English Translation for PCT/EP2021/067103, mailed Oct. 26, 2021, 5 pages.

(Continued)

*Primary Examiner* — Andrew Yang
(74) *Attorney, Agent, or Firm* — Nixon & Vanderhye P.C.

(57) ABSTRACT

A screw element for the fixation of bone components and bone fragments is disclosed having a shaft with an outside screw thread and a longitudinal axis extending along the shaft and defining a distal direction and a proximal direction, and an insertion direction and an opposite removal direction, and has a tool attachment point starting radially inwards and the tool attachment point has a central opening and in the wall of this opening at least five tooth profiles directed radially outwards and mainly parallel to the screw axis directed radially outwards and mainly parallel to the screw axis are formed in the wall of this opening, and for each tooth profile an insertion wall in insertion direction and a removal wall in removal direction can be separated, and that the surface of the insertion wall is greater than the surface of the removal wall.

16 Claims, 6 Drawing Sheets

(56) References Cited

OTHER PUBLICATIONS

Written Opinion of the ISA for PCT/EP2021/067103, mailed Oct. 26, 2021, 8 pages.

* cited by examiner

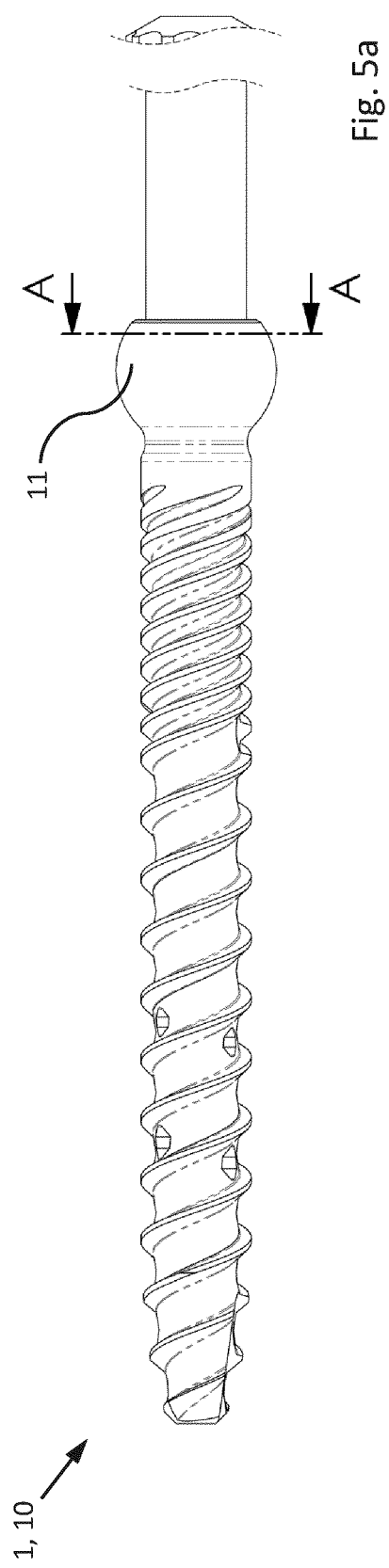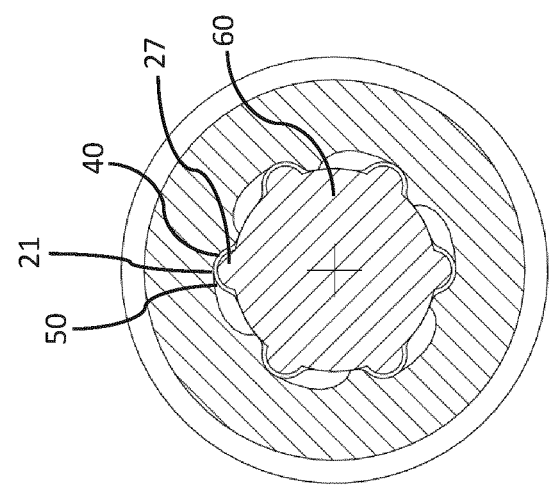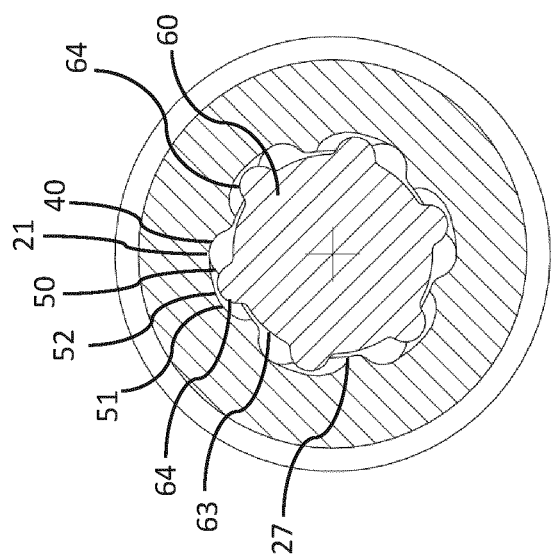

TOOL ATTACHMENT POINT WITH ALIGNMENT AID FOR SCREW ELEMENTS

CROSS REFERENCE TO RELATED APPLICATIONS

The present application is a National Phase of International Application Number PCT/EP2021/067103 filed Jun. 23, 2021, which designated the U.S. and claims priority benefits from German Patent Application Number DE 10 2020 003 774.7 filed Jun. 24, 2020, the entire contents of each of which are hereby incorporated by reference.

STATE OF THE ART

Efficient surgery primarily involves saving time, which can be achieved by simplifying the application in various ways. This includes in particular the assembly of a screw with a screw driver, as this is one of the most frequent steps in a surgical procedure. An essential step when attaching a screw driver to a screw is that the tool drive of the screw driver must match the rotational alignment of the tool attachment point of the screw exactly. This is not always accomplished on the first try and is not intuitive for the user. As a result, this step can be enormously time-consuming, also due to the high number of repetitions in a surgical procedure. If a surgical procedure is performed under difficult visual conditions or as a minimally invasive procedure, the docking of the screw driver to the screw can also sometimes be error-prone.

EP2932929A1 describes a screw element which has a Torx®-like multilobular socket as a tool attachment point for driving a screw. To enable a screw driver to be assembled with the screw element in any rotational position, symmetrically arranged tapered guide grooves are located on the distal area of the tool attachment point on each tooth profile. However, the disadvantage of these guide grooves is that the contact surfaces of the interlocking teeth between the screw driver and screw are reduced, because contact with the screwdriver is missing where the guide grooves are provided. This means that significantly lower torques can be transmitted compared to a tool attachment point without guide grooves and with the same overall height. This is a major disadvantage for orthopedic screw elements, as high torques often have to be transmitted.

With the present invention, it is possible to achieve the same high screw-in torques as are possible with a multilobular socket without alignment aid. This is achieved by providing the alignment aid asymmetrically in the tooth profile.

From the mechanical basics it is known that the torque for screwing in a screw is always higher than the torque for unscrewing a screw. It is therefore necessary to maximize the contact surfaces of a tool attachment point to a screwdriver in the insertion direction, while at the same time the opposite contact surfaces in the removal direction can be made smaller. The reduced contact surfaces in the removal direction allow space for a corresponding alignment aid for the screw driver.

REPRESENTATION OF THE INVENTION

For the screw element (10) according to the invention, space-allocating coordinate references are defined, such as the proximal direction (101), the distal direction (102), which extend along a central axis (103). The radial dimension (104) is defined extending outward from the central axis (103). The circumferential dimension is defined by a constant radius and along a variable circumferential angle (FIG. 1a).

The screw element (10) according to the invention is used for the fixation of bone components and bone fragments. It consists of a shaft (13) with an outside screw thread (17) and a tool attachment point (20) starting from the radial inside. The outside screw thread specifies a direction of rotation for screwing in and unscrewing the screw element (10). Depending on this direction of rotation, two further spatial directions are defined; the insertion direction (110) and the removal direction (120) (FIG. 1b).

The Screw element can be a bone screw with a head comprising a drive section, which is defined here as a tool attachment point (20). However, it may also be a grub screw used as a locking element in the receiving portion of a polyaxial pedicle screw or in a bone plate. More generally, the screw element can be used in cases with poor or no visibility of the insertion site, where the position of an already placed screw needs to be adjusted. In a preferred embodiment, the screw element (10) has a head (11) which is spherically shaped, a neck area (12) and a shaft area (13) with bone thread (18) and the tool attachment point (20) is provided in the head (11) (FIG. 1a). The tool attachment point (20) is open in proximal direction (101) and optionally ends in a concentric cone-like recess (15). The head (11) is preferably a lens, a sloped head or a spherical head. However, a composition of different curves and surfaces is also possible. The main feature of the head is that the head (11) has a larger outer diameter than the neck area (12). For minimally invasive treatment, it is advantageous if the bone anchor has a groove opening (16) passing completely through it, through which a surgical guide wire can be passed. Preferably, the tool attachment point (20) is designed as a blind hole and is bounded by a wall (14) in the distal direction (102). Optionally, this wall (14) can be designed as a slope, which extends radially inwards in a conical shape in increasing distal direction (102).

It should also be mentioned that the screw element (10) has a tool attachment point (20) extending radially inwards and a central opening (27) is provided therein. At least five tooth profiles (e.g. 21, 22, 23, 24, 25, 26) directed radially outward (104) and mainly parallel to the screw axis (103) are formed in the wall of this opening (27) (FIG. 2). Preferably, the tooth profiles are designed as concave walls, resulting in a Torx® like or standardized Torx® profile. Optimally, transition radii (56, 41) are located between the tooth profiles (e.g. 21) and the central opening (27). For each tooth profile, the tooth profile surface (e.g. 21) can be separated into an insertion wall (40) in insertion direction (110) and a removal wall (50) in removal direction (120). An imaginary separation line (42) in FIG. 3 serves to separate these walls (40 and 50). An essential feature of the invention is that the surface of the insertion wall (40) is larger than the surface of the removal wall (50). Thus, a screwdriver (60) with a complementary tooth profile has the full engagement height in insertion direction. In the less loaded removal direction, the contact surface between the screw driver and the screw element is smaller.

FIG. 3 shows the features according to the invention. It can be seen that the tool attachment point (20) can be separated along the longitudinal axis (103) into at least two sections (53, 57), whereby a first section (53) is formed coming from the distal direction and the surfaces of the insertion and removal walls (40, 50) of each tooth profile (e.g. 21 . . . 26) are approximately the same size up to the height of a section parting plane (54). Furthermore, the insertion wall (40) runs mainly parallel to the screw axis (103) over the entire height of both sections (43, 53 and 57). In the second section (57), a guiding wall (51) is formed starting from the section parting plane (54), the guiding wall (51) adjoining the removal wall (50) of the first section (53) and this guiding wall (51) being increasingly spaced apart from the insertion wall (40) in proximal direction (101). The increasing spacing between the guiding wall (51) and the insertion wall (40) runs mainly along the circumference in the removal direction (120), resulting in a wall (52) extending in the peripheral direction.

In summary, this means that in the first section (53) a conventional tool attachment point is provided which has symmetrical tooth profiles (e.g. 21 . . . 26) aligned mainly parallel to the screw axis (103). In the second section (57), the walls are arranged to provide the alignment aid for the screw driver (60). The alignment aid is shown in FIG. 2 in cross-section transverse to the screw axis (103) at the level of the second section (57). It can be seen that the walls (51, 52 and 40) create a sectional contour that corresponds approximately to a rotational slotted hole (58) and can be defined by an opening angle (55). The opening angle (55) has a maximum angle between 10° to 60°, but preferably 20° to 50°. Said angle (55) decreases from the proximal direction (101) to the distal direction (102), said angle (55) remaining constant in the first section (53). These features are illustrated by the different sectional planes in FIG. 2.

Preferably, the sections (53 and 57) have a different height. It is possible, for example, that the height of the first section (53) is greater than the height of the second section (57), or that the height of the second section (57) is greater than the height of the first section (53), or that the heights of the two sections (53) and (57) are approximately equal.

FIG. 4 shows a typical screw driver (60) with a shaft (66) defining a longitudinal screwdriver axis (67). At the distal end (61) is a drive unit (65) with teeth (64) and a core (63). The drive unit (65) ends in a conical outlet (62) in proximal direction. The aforementioned sections (53, 57) of the tool attachment point (20) of the screw element (10) can optionally end in a concentric cone-like recess (15) in proximal direction (101) (FIG. 4). The cone-like recess (15) has two functions. On the one hand, when the screw driver (60) first contacts the screw element (10), the screw axis (103) is aligned orthogonally with the axis (67) of the screw driver (60) by guiding the distal end (61) along the cone (15) to the central axis (103) of the screw element (10). On the other hand, when the screw driver (60) is fully inserted, a planar contact is established between the cone like recess (14) and the cone like outlet (62), which provides a loadable orthograde alignment of the screw element (10) with respect to the screw driver (60).

Another feature is that the screw driver (60) has a drive unit (65) with teeth (64) complementary to the first section (53) (FIG. 5c), which extends mainly parallel to the central axis of the screw driver (67), and the screw element (10) has guiding walls (51) in the area of the second section (57), which align the teeth (64) of the screw driver (60) rotationally round the central axis of the screw driver (67) (FIG. 5b). 5b), so that a larger contact surface is provided for the teeth (64) of the screw driver (60) in the insertion direction (110) than in the removal direction (120).

FIG. 6 shows a system of an osteosynthesis device (1) for the treatment of spinal deformities and defects, which consists of at least two screw elements (10), wherein one screw element (10) is provided as a bone anchor with a bone thread (18), which is polyaxially supported in a u-shaped fork head (3) and a second screw element (2) being suitable as a locking element for fixing a connection rod (4).

BRIEF DESCRIPTION OF THE DRAWINGS SHOW

FIG. 1a an oblique view of the screw element according to the invention.

FIG. 1b the top view of the tool attachment point.

FIG. 5a shows a side view according to FIG. 4.

FIG. 5b shows in section how the screw driver is guided and aligned in any rotational position during insertion into the tool attachment point, and FIG. 5c shows the situation when the screw driver is inserted once the drive unit of the screw driver has passed the section for alignment and is engaged with the multilobular socket.

Figure 1B:
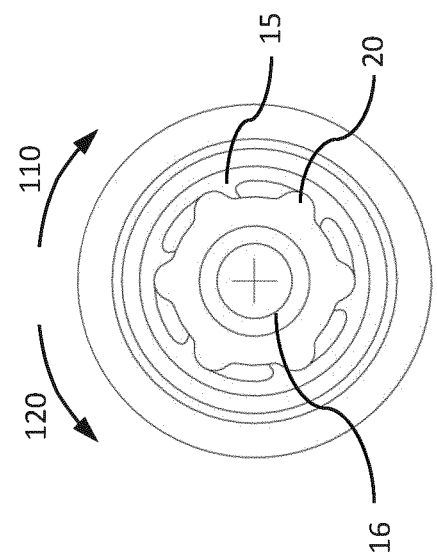
Figure 1A:
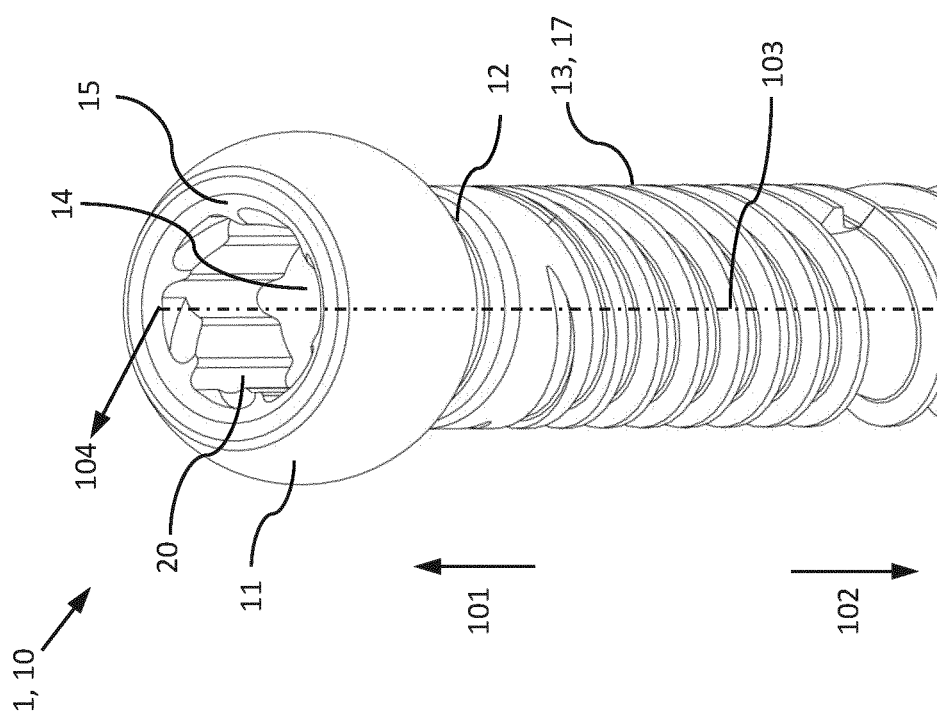
Figure 2:
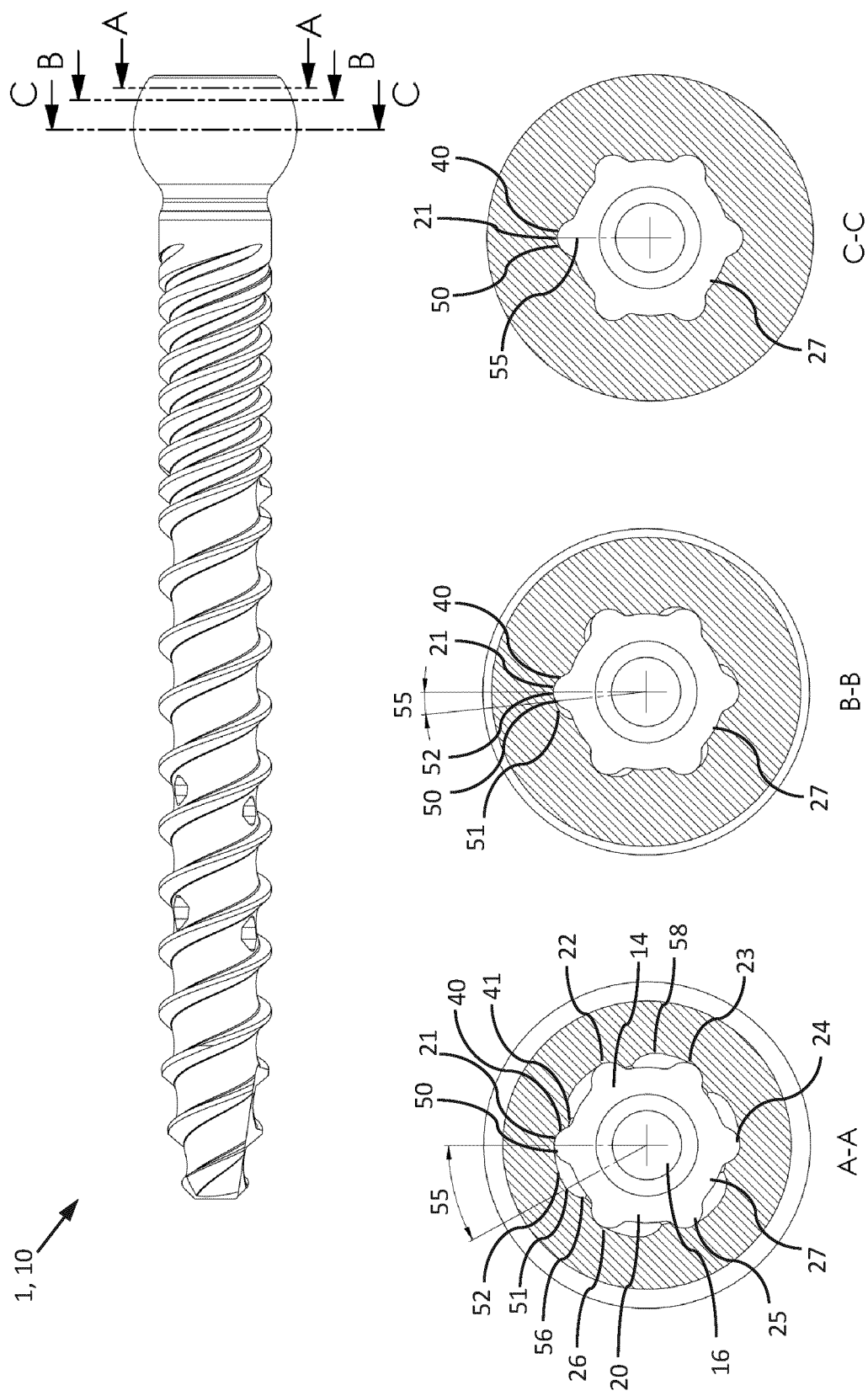
FIG. 2 shows a side view of the screw element according to the invention and three sections through the tool attachment point provided at different positions.
Figure 3:
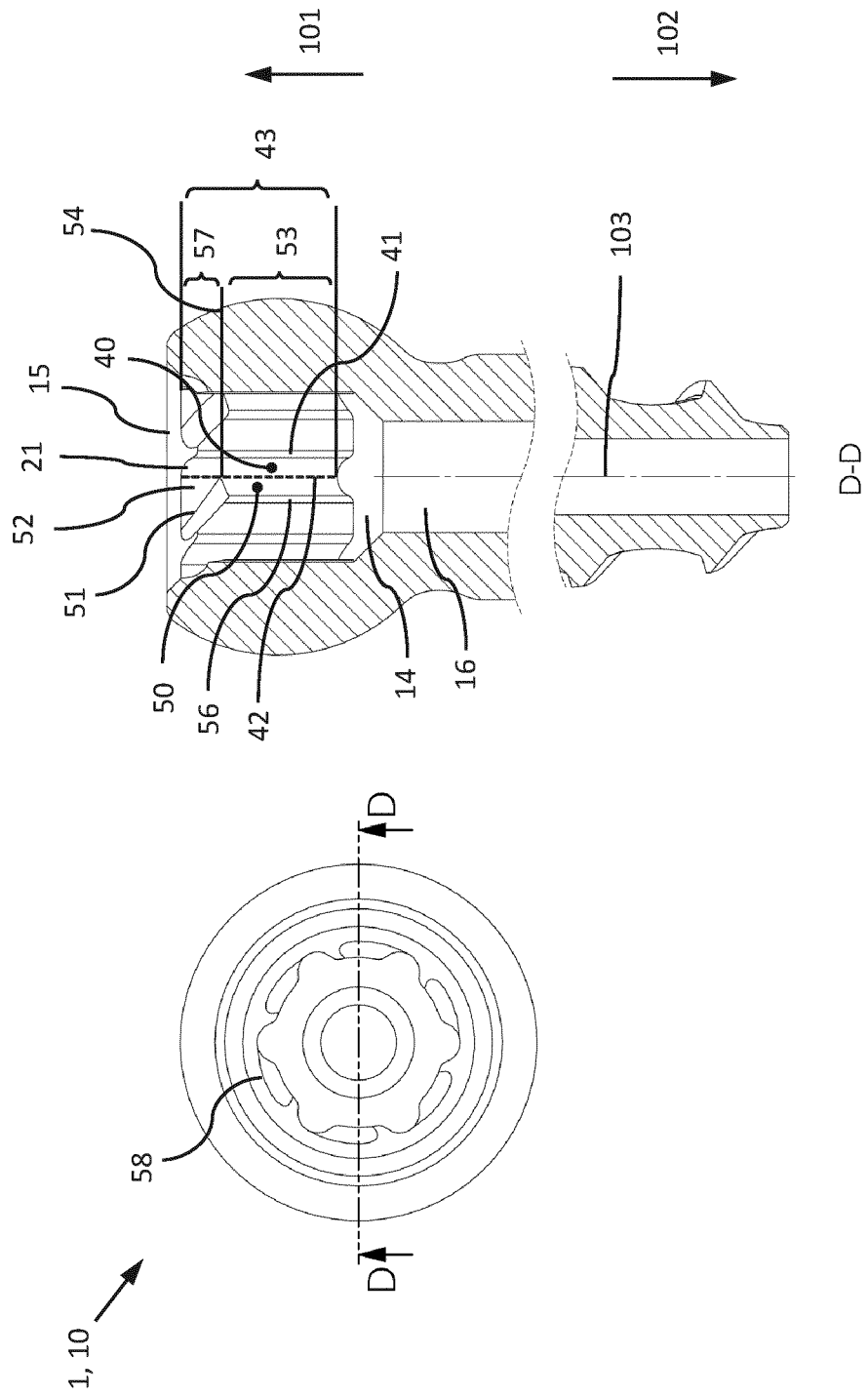
FIG. 3 shows a cutaway side view of the tool attachment point.
Figure 4:
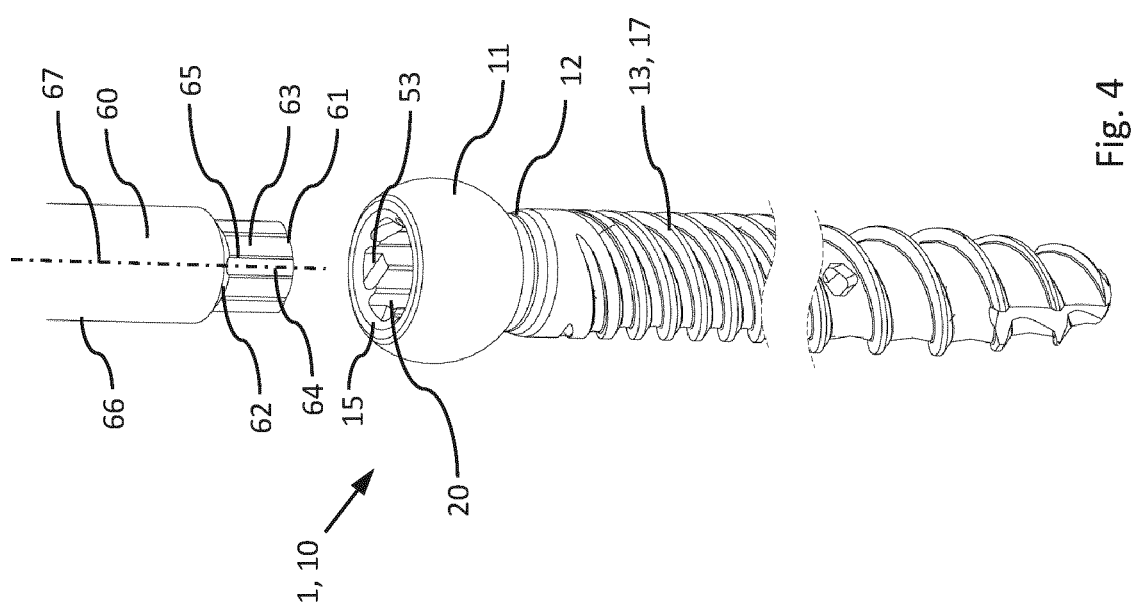
FIG. 4 shows the interaction of a screw element and a screw driver.
Figure 6:
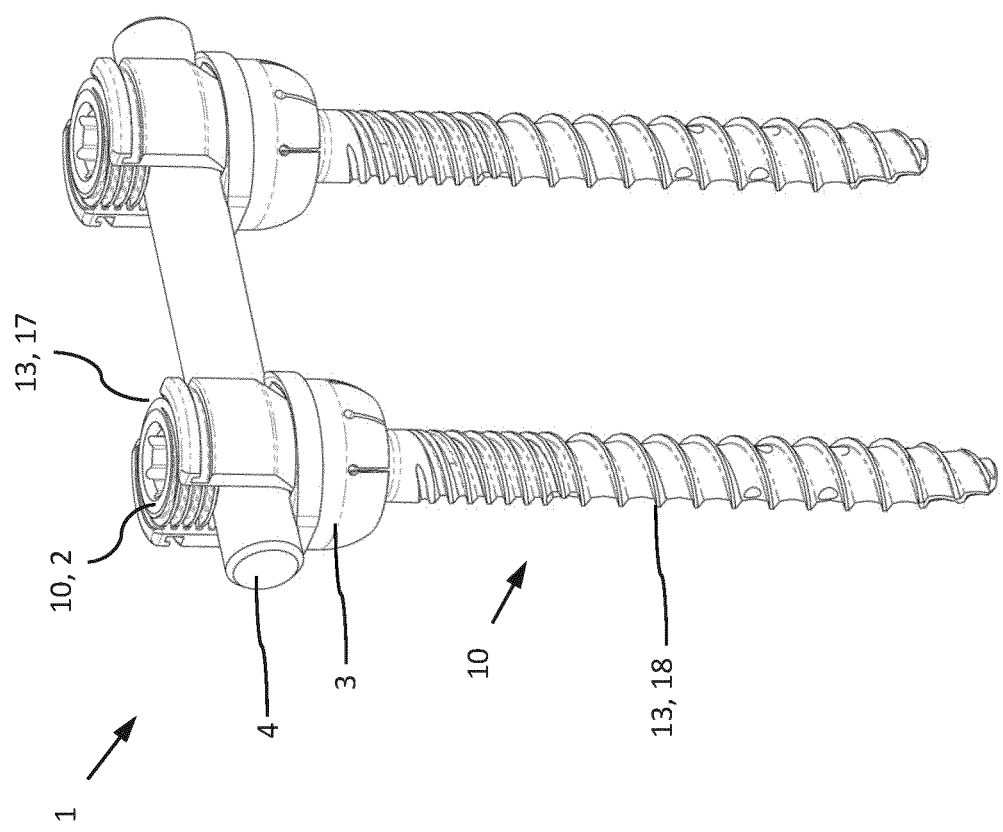
FIG. 6 shows different screw elements of an osteosynthesis device.

The invention claimed is:

1. A screw element for the fixation of bone components and bone fragments comprising a shaft with an outside screw thread and a longitudinal axis extending along the shaft and thereby defining a distal direction and a proximal direction, and an insertion direction and an opposite removal direction, and has a tool attachment point starting radially inwards and the tool attachment point has a central opening and in the wall of this opening at least five tooth profiles directed radially outwards and mainly parallel to the screw axis directed radially outwards and mainly parallel to the screw axis are formed in the wall of this opening, and for each tooth profile an insertion wall in insertion direction and a removal wall in removal direction can be separated, characterized in that the surface of the insertion wall is greater than the surface of the removal wall,
   wherein the tool attachment point is separable along the longitudinal axis into at least two sections, wherein a first section is formed coming from the distal direction and the surfaces of the insertion and removal walls of each tooth profile are approximately equal in size up to the height of a section parting plane, and
   wherein the tool attachment point is separable along the longitudinal direction into at least two sections and the insertion wall extends mainly parallel to the screw axis over the entire height of both sections.

2. The screw element according to claim 1, wherein a guiding wall is formed in a second section starting from the section parting plane, wherein the guiding wall adjoins the removal wall of the first section and said guiding wall is increasingly spaced apart in proximal direction from the insertion wall.

3. The screw element according to claim 2, wherein the increasing spacing between the guiding wall and insertion wall is mainly along the circumference in removal direction, resulting in a wall extending in the peripheral direction.

4. The screw element according to claim 1, wherein in cross-section transverse to the screw axis at the level of a second section, the walls have a sectional contour which corresponds approximately to a rotational slotted hole and can be defined by an opening angle.

5. The screw element according to claim 4, wherein the opening angle has a maximum angle of between 10° and 60°, and said angle decreases towards the distal direction.

6. The screw element according to claim 1, wherein the height of the first section is greater than the height for the second section.

7. The screw element according to claim 1, wherein the height of the second section is greater than the height of the first section.

8. The screw element according to claim 1, wherein the heights of the two sections are approximately equal.

9. The screw element according to claim 1, wherein the tool attachment point is open in the proximal direction and ends in a concentric cone like recess.

10. The screw element according to claim 1, wherein the tool attachment point is bounded in distal direction by a wall.

11. The screw element according to claim 10, wherein the wall extends as a slope in increasing distal direction radially inwards.

12. The screw element according to claim 1, wherein the central opening has a concentric cylindrical course.

13. The screw element according to claim 1, wherein the screw element additionally comprises a head, a neck area and a shaft area with bone thread and the tool attachment point is provided in the head.

14. The screw element according to claim 1, wherein the screw element has a continuous groove.

15. A system of an osteosynthesis device, wherein the osteosynthesis device comprises at least two screw elements according to claim 1, wherein one screw element being provided as a bone anchor with a bone thread and a second screw element being suitable as a locking element for fixing a connection rod.

16. A system comprising a screw driver and at least one screw element according to claim 2, wherein the screw driver has a drive unit with teeth complementary to the first section, said drive unit extending mainly parallel to the central axis of the screw driver and the screw element has guiding walls in the area of the second section, which align the teeth of the screw driver rotationally round the central axis of the screw driver, so that a larger contact surface is provided for the teeth of the screw driver in the insertion direction than in the removal direction.

* * * * *